United States Patent
Reibman et al.

(10) Patent No.: US 10,026,010 B2
(45) Date of Patent: Jul. 17, 2018

(54) IMAGE QUALITY ESTIMATION USING A REFERENCE IMAGE PORTION

(71) Applicant: AT&T Intellectual Property I, L.P., Atlanta, GA (US)

(72) Inventors: Amy Ruth Reibman, Chatham, NJ (US); Zhu Liu, Marlboro, NJ (US); Lee Begeja, Gillete, NJ (US); Bernard S. Renger, New Providence, NJ (US); David Crawford Gibbon, Lincroft, NJ (US); Behzad Shahraray, Holmdel, NJ (US); Raghuraman Gopalan, Freehold, NJ (US); Eric Zavesky, Austin, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

(21) Appl. No.: 14/277,329

(22) Filed: May 14, 2014

(65) Prior Publication Data

US 2015/0332123 A1 Nov. 19, 2015

(51) Int. Cl.
*G06K 9/00* (2006.01)
*G06K 9/46* (2006.01)
(Continued)

(52) U.S. Cl.
CPC ............. *G06K 9/6215* (2013.01); *G06K 9/46* (2013.01); *G06K 9/4671* (2013.01);
(Continued)

(58) Field of Classification Search
USPC ............... 382/190, 154, 112, 165, 254, 305; 707/741
See application file for complete search history.

(56) References Cited

U.S. PATENT DOCUMENTS 5,828,786 A * 10/1998 Rao ..................... G06K 9/00711
348/415.1
6,298,145 B1 * 10/2001 Zhang ................. G06K 9/00228
348/169
(Continued)

FOREIGN PATENT DOCUMENTS

AU 2012219026 A1 10/2013
WO 0036564 A2 6/2000
(Continued)

OTHER PUBLICATIONS

Bauer, J. et al., "Comparing Several Implementations of Two Recently Published Feature Detectors", Proceedings of the International Conference on Intelligent and Autonomous Systems, vol. 6, Part No. 1, 2007, 6 pages.
(Continued)

*Primary Examiner* — Kathleen Y Dulaney
(74) *Attorney, Agent, or Firm* — Toler Law Group, PC

(57) ABSTRACT

A particular method includes receiving a set of images, where each image of the set of images is related to a common scene. The method also includes determining a first subset of pixels of a first image of the set, where the first subset of pixels corresponds to a second subset of pixels of a second image of the set. The method further includes generating a first image quality estimate of the first image based on a comparison of the first subset of pixels and the second subset of pixels.

20 Claims, 5 Drawing Sheets

(51) Int. Cl.
*G06K 9/40* (2006.01)
*G06K 9/54* (2006.01)
*G06F 7/00* (2006.01)
*G06K 9/62* (2006.01)
*G06T 7/00* (2017.01)

(52) U.S. Cl.
CPC ......... *G06K 9/6202* (2013.01); *G06K 9/6267* (2013.01); *G06T 7/0002* (2013.01); *G06T 2207/30168* (2013.01)

(56) References Cited

U.S. PATENT DOCUMENTS

| | | | |
|---|---|---|---|
| 6,721,457 B1* | 4/2004 | Atkins | G06T 5/20 358/1.9 |
| 6,816,847 B1* | 11/2004 | Toyama | G06K 9/00 382/156 |
| 6,940,545 B1* | 9/2005 | Ray | G06K 9/00228 348/207.99 |
| 7,167,191 B2* | 1/2007 | Hull | G06F 17/30038 707/E17.009 |
| 7,450,747 B2* | 11/2008 | Jabri | G16H 40/63 382/132 |
| 7,680,343 B2* | 3/2010 | Covell | G06F 17/30256 382/112 |
| 8,150,098 B2 | 4/2012 | Gallagher et al. | |
| 8,254,679 B2 | 8/2012 | Marchesotti | |
| 8,259,161 B1* | 9/2012 | Huang | H04N 13/0221 348/50 |
| 8,311,364 B2 | 11/2012 | Cerosaletti et al. | |
| 8,340,437 B2 | 12/2012 | Abramoff et al. | |
| 8,438,163 B1* | 5/2013 | Li | G06F 17/3028 382/159 |
| 8,494,299 B2 | 7/2013 | Steinberg et al. | |
| 8,538,201 B2 | 9/2013 | Damkat | |
| 8,571,333 B2 | 10/2013 | Denney et al. | |
| 8,582,916 B2 | 11/2013 | Bar-Aviv et al. | |
| 8,594,385 B2 | 11/2013 | Marchesotti et al. | |
| 8,611,620 B2 | 12/2013 | Karasikov et al. | |
| 8,611,691 B2* | 12/2013 | Vorontsov | G06T 5/001 348/607 |
| 8,750,632 B2* | 6/2014 | Nakamura | H04N 19/597 382/154 |
| 8,774,528 B2* | 7/2014 | Hibino | G06K 9/00671 382/112 |
| 2001/0036307 A1* | 11/2001 | Hanna | G06T 5/50 382/154 |
| 2002/0181767 A1* | 12/2002 | Deng | G06K 9/00664 382/165 |
| 2003/0068100 A1* | 4/2003 | Covell | G06F 17/30256 382/305 |
| 2003/0081249 A1* | 5/2003 | Ahmad | H04N 1/00132 358/1.15 |
| 2004/0223649 A1* | 11/2004 | Zacks | G06T 11/00 382/218 |
| 2004/0247174 A1* | 12/2004 | Lyons | G06F 3/04845 382/154 |
| 2004/0258304 A1* | 12/2004 | Shiota | G06F 17/30247 382/170 |
| 2005/0063610 A1* | 3/2005 | Wu | G06T 7/32 382/294 |
| 2005/0089213 A1* | 4/2005 | Geng | G06K 9/00214 382/154 |
| 2005/0089246 A1* | 4/2005 | Luo | G06K 9/00268 382/286 |
| 2006/0257050 A1* | 11/2006 | Obrador | G06T 7/0002 382/286 |
| 2008/0226148 A1* | 9/2008 | Gu | G06T 5/007 382/128 |
| 2008/0253685 A1* | 10/2008 | Kuranov | G06T 3/4038 382/284 |
| 2010/0157154 A1* | 6/2010 | Kobayashi et al. | 348/557 |
| 2010/0209016 A1* | 8/2010 | Kimata et al. | 382/284 |
| 2010/0232655 A1* | 9/2010 | Hanna | G06K 9/00604 382/117 |
| 2010/0309335 A1* | 12/2010 | Brunner | H04N 5/144 348/231.6 |
| 2011/0033119 A1* | 2/2011 | Rezazadeh | G06K 9/4604 382/199 |
| 2012/0014560 A1* | 1/2012 | Obrador | G06K 9/00677 382/103 |
| 2013/0022273 A1* | 1/2013 | Yamazoe | G06K 9/00228 382/190 |
| 2013/0028537 A1 | 1/2013 | Miyake et al. | |
| 2013/0108152 A1* | 5/2013 | Deng | G06T 7/0002 382/159 |
| 2013/0243268 A1* | 9/2013 | Bedros | G06K 9/036 382/118 |
| 2013/0243334 A1 | 9/2013 | Meyers et al. | |
| 2013/0272615 A1 | 10/2013 | Nakamura | |
| 2013/0336590 A1* | 12/2013 | Sentinelli | H04N 5/772 382/218 |
| 2014/0029851 A1 | 1/2014 | Tai et al. | |
| 2014/0210725 A1* | 7/2014 | Lee | G06F 3/03543 345/166 |
| 2014/0250110 A1* | 9/2014 | Yang | G06F 17/30867 707/723 |
| 2014/0363048 A1* | 12/2014 | Vrcelj | G06K 9/78 382/103 |
| 2015/0063724 A1* | 3/2015 | Ikeda | G06F 17/30259 382/305 |
| 2015/0130799 A1* | 5/2015 | Holzer | G06F 3/04842 345/420 |

FOREIGN PATENT DOCUMENTS

WO 0161648 A2 8/2001
WO 2013075324 A1 5/2013

OTHER PUBLICATIONS

Bay, H. et al., "Speeded-Up Robust Features (SURF)", Computer Vision and Image Understanding, vol. 110, Issue 3, Jun. 2008, 14 pages.
Ke, Y. et al., "The Design of High-Level Features for Photo Quality Assessment", IEEE Computer Society Conference on Computer Vision and Pattern Recognition, vol. 1, Jun. 17-22, 2006, 8 pages.
Datta, R. et al., "ACQUINE: Aesthetic Quality Inference Engine Real-Time Automatic Rating of Photo Aesthetics", Proceedings of the International Conference on Multimedia Information Retrieval, ACM Mar. 29, 2010, 4 pages.
Wang Z. et al., "Image Quality Assessment: From Error Visibility to Structural Similarity", IEEE Transactions on Image Processing, vol. 13, Issue 4, Apr. 2004, 14 pages.

* cited by examiner

IMAGE QUALITY ESTIMATION USING A REFERENCE IMAGE PORTION

FIELD OF THE DISCLOSURE

The present disclosure is generally related to estimating an image quality of an image using a reference image portion.

BACKGROUND

A set of similar images is often created when a person takes multiple photographs of a scene. The set of similar images may have different viewing angles, zoom settings, lighting, and exposure settings. Images similar to a particular image may be available via the internet. For example, images taken at a famous vacation landmark or tourist location may be readily available via the internet.

When multiple images of an object or scene are available, a user may have interest in determining which of the images has the "best" image quality. Traditional methods for image quality evaluation include "full-reference" methods, "reduced reference" methods, and "no reference" methods. "Full reference" methods compare a full first image to a full second image. "Reduced reference" methods compare a full first image to a portion of a full second image. "No reference" methods do not use a second image. Rather, in "no reference" methods, blurriness, blockiness (e.g., due to compression), or noisiness (e.g., due to low light image capture) of a full image is estimated.

DETAILED DESCRIPTION

The present disclosure describes systems and methods of estimating an image quality of each image in a set of images using other images in the set of images. For example, the described techniques include identifying a correspondence or match between pixel regions in the images of the set and estimating image quality based on comparing the pixel regions. The images in the set may not be identical snapshots. For example, information regarding darker regions may be more readily available in a slightly overexposed image and information regarding lighter regions may be more readily available in a slightly underexposed image. As another example, an object may be blurry in one image but clear in another image. Images in the set may also be received from different devices. For example, the set of images may include images captured by a camera of a computing device and/or images downloaded via the internet.

In a particular embodiment, a method includes receiving, by a device including a processor, a set of images, where each image of the set of images is related to a common scene. The method also includes determining, by the device, a first subset of pixels of a first image of the set that corresponds to a second subset of pixels of a second image of the set. The method further includes generating, by the device a first image quality estimate of the first image based on a comparison of the first subset of pixels and the second subset of pixels.

In another particular embodiment, an apparatus includes a processor and a memory storing instructions executable by the processor to perform operations including receiving a set of images, where each image of the set of images is related to a common scene. The operations also include identifying a feature of the common scene that is represented in each image in the set of images, determining a first subset of pixels of a first image of the set, and determining a second subset of pixels of a second image of the set. The first subset of pixels and the second subset of pixels correspond to the feature. The operations further include generating a first image quality estimate of the first image based on a comparison of the first subset of pixels and the second subset of pixels.

In another particular embodiment, a computer-readable storage device stores instructions that, when executed by a computer, cause the computer to perform operations including receiving a set of images, where each image of the set of images is related to a common scene and is captured by a particular device. The operations also include determining a first subset of pixels of a first image of the set that corresponds to a second subset of pixels of a second image of the set. The operations further include generating a first image quality estimate of the first image based on a comparison of the first subset of pixels and the second subset of pixels.

Figure 1:
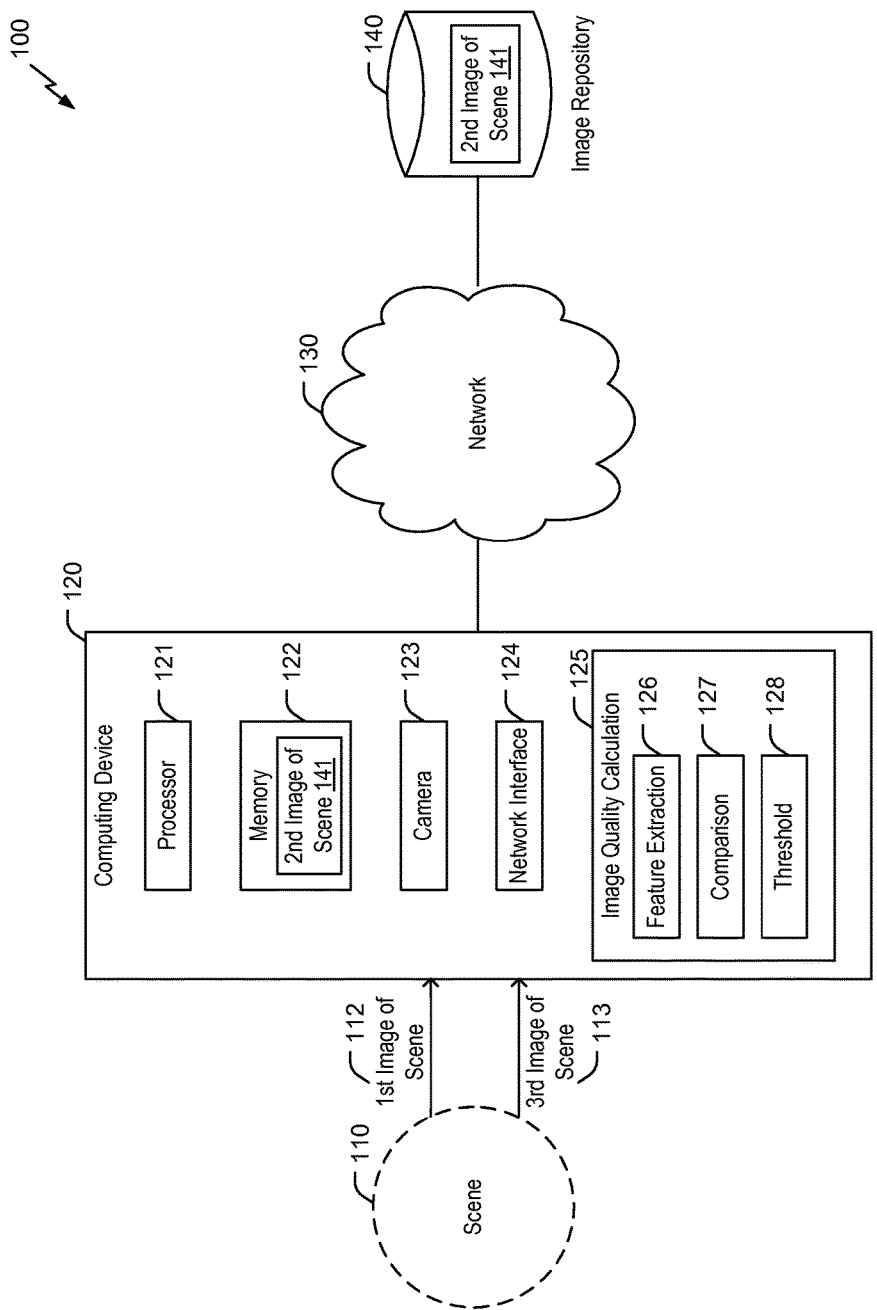
FIG. 1 is a diagram to illustrate a particular embodiment of a computing device that is operable to estimate an image quality of an image.

FIG. 1 depicts a particular illustrative embodiment of a computing device 120 that is located within an image environment 100. The computing device 120 is adapted to receive and store multiple images of a scene 110. For example, the scene 110 may be a physical environment and the computing device 120 may include an image capture device, such as a camera 123. In a particular embodiment, the computing device 120 is a mobile communication device, such as a wireless phone that includes a camera.

The computing device 120 is operable to capture one or more images of the scene 110, to store one or more images of the scene 110, and/or to download one or more images of the scene 110 via a network 130. For example, a first set of images including a first image 112 of the scene 110 may be captured by the camera 123. The captured first image 112 may be stored within a memory, such as a memory 122 of the computing device 120. The computing device 120 also includes a processor 121 that is coupled to the memory 122 and coupled to the camera 123. The computing device 120 further includes a network interface 124 for communication with the network 130. The network 130 may be a wide area wireless network, and the network interface 124 may be a wireless transceiver, such as a cellular or wi-fi transceiver, that is configured to communicate via the network 130.

As illustrated in FIG. 1, the network 130 may provide access to a remote device, such as an image repository 140 that includes multiple stored images, such as one or more reference images. For example, a second image 141 (alternately referred to as a reference image) may be an image of a particular scene, such as the scene 110. As an illustrative non-limiting example, the scene 110 may correspond to a tourist landmark, the computing device 120 may be used by a tourist visiting the landmark to capture images of the landmark, and the image repository 140 may store previously captured images of the landmark, such as images captured by other tourists and professional photographers. Thus, the computing device 120 may capture real-time (or near-real-time) images of the scene 110 and may also have access, via the network 130, to stored reference images that also correspond to the scene 110. Examples of image repositories include a publicly available repository of images or cloud storage of images previously captured by the user of the computing device 120. Further, when the computing device 120 captures a set of images, the first image 112 and the second image 141 may both be from the set. Thus, one or more images of the set may be a reference image with respect to one or more other images of the set.

When a user captures multiple images of the scene 110 using the camera 123, the images may have different resolutions, may have different image processing filters applied during image capture, may correspond to different angles or perspectives of the scene 110, etc. A user of the computing device 120 may have interest in determining which captured image is a "highest quality" image that is suitable for use in a subsequent application (e.g., e-mailing to friends or family, posting on a social network, etc.).

In a particular embodiment, the computing device 120 includes an image quality calculation module 125 that is operable to estimate image quality of images captured, stored, and/or downloaded by the computing device 120. For example, the image quality calculation module 125 may correspond to hardware and/or software at the computing device 120. To illustrate, the image quality calculation module 125 may be implemented by hardware components within the processor 121 and/or instructions stored at the memory 122 that are executable by the processor 121. In the embodiment shown in FIG. 1, the image quality calculation module 125 includes a feature extraction module 126 and a comparison module 127. The feature extraction module 126 may identify and extract features from one or more images in a set of images received by the computing device 120. For example, the feature extraction module 126 may use feature extraction procedures, such as scale-invariant feature transform (SIFT), features from accelerated segment test (FAST), speeded up robust features (SURF), etc.

The comparison module 127 may compare the extracted features from the images processed by the feature extraction module 126. For example, the feature extraction module 126 may extract features from the first image 112 of the scene 110 and from the second image 141 of the scene 110. Because the images 112, 141 are of the same scene 110, certain features extracted from the first image 112 may match or correspond to certain features extracted from the second image 141. The comparison module 127 may compare extracted features to determine subsets of pixels in the images 112, 141 that correspond to the common scene 110 or an object depicted therein. For example, the comparison module 127 may determine a first subset of pixels of the first image 112 that corresponds to a second subset of pixels of the second image 141. Thus, images that correspond to the common scene 110 may not be exactly identical, but rather may at least partially overlap in terms of object(s) depicted in the images, although such object(s) may be depicted from different angles, at different scales, in different lighting/color, etc. The comparison module 127 may generate a first image quality estimate of the first image based on a comparison of the first subset of pixels to the second subset of pixels. As an illustrative non-limiting example, the comparison module 127 may generate the first image quality estimate based on a comparison of a variation (e.g., in intensity, coloration, contrast, spatial frequency, etc.) within the first subset of pixels to a variation in the second subset of pixels. In a particular embodiment, because the subsets of pixels correspond to a common image feature, greater variation is interpreted as reflecting greater image detail, and therefore greater image quality.

In an illustrative embodiment, the first subset of pixels and the second subset of pixels are determined by comparing pixels of the first image 112 to pixels of the second image 141 to identify a feature of the common scene 110 that is represented in the first image 112 and in the second image 141. The first subset of pixels may correspond to a particular feature in the first image 112 (e.g., a particular edge, corner, shape, etc. depicted in the first image 112), the second subset of pixels may correspond to the same feature in the second image 141, and the comparison module 127 may determine that the first subset of pixels and the second subset of pixels include common feature keypoints identified by the feature extraction module 126. The comparison module 127 may determine an image quality of the first image 112 based on a comparison of a portion of the first image 112 to a portion of a reference image, such as the second subset of pixels of the second image 141.

In a particular embodiment, the computing device 120 may receive multiple images of the scene 110 and determine an image quality of each of the multiple images. For example, the camera 123 may capture the first image 112 and a third image 113 of the scene 110. The comparison module 127 may generate a third quality image estimate of the third image 113 based on a comparison of a third subset of pixels of the third image 113 and the second subset of pixels previously identified with respect to the second (reference) image 141. As an illustrative non-limiting example, the comparison module 127 may generate the third image quality estimate based on a comparison of a variation (e.g., in intensity, coloration, contrast, spatial frequency, etc.) within the third subset of pixels to a variation in the second subset of pixels.

In a particular embodiment, the comparison module 127 may determine whether the first image quality estimate of the first image 112 and the third image quality estimate of the third image 113 satisfy an image quality threshold, such as an illustrated threshold 128. Based on a comparison of the first image quality estimate to the third image quality estimate, the comparison module 127 may designate the first image 112 or the third image 113 as a "preferred image." Alternately, or in addition, the computing device 120 may generate and display an indication regarding which image(s) have an "acceptable" image quality that satisfies the threshold 128. As an illustrative non-limiting example, there may be more variation (e.g., in intensity, coloration, contrast, spatial frequency, etc.) in the first subset of pixels than in the third subset of pixels. In this example, the comparison module 127 may determine that the first image 112 has more detail, and therefore higher quality, than the third image 113. It should be noted that the present disclosure is not limited to estimating and comparing image quality based on two or three images. In alternate embodiments, more than three images may be used.

A user may use a preferred image (or multiple images that satisfy the threshold 128) in an application, such as e-mail, multimedia messaging, social network sharing, etc. In a particular embodiment, the user may be provided an option to delete captured images of the scene 110 other than the preferred image (or multiple images that satisfy the threshold 128). Further, the user may upload the preferred image (or multiple images that satisfy the threshold 128) to the image repository 140 for subsequent use, such as during subsequent image quality estimations by the computing device 120 or other computing devices.

It should be noted that although FIG. 1 shows two captured images and a single reference image, this is for illustration only and not to be considered limiting. In alternate embodiments, any number of captured images and reference images may be used during image quality estimation. Further, it should be noted that the described techniques are not limited to the specific device configuration. In an alternate configuration, separate devices may capture images, store reference images, and estimate image quality. For example, image quality estimation may be performed by a network-accessible server as part of a cloud service that is configured to receive captured images from computing devices and to access online image repositories.

In another exemplary embodiment, the image quality calculation module 125 facilitates a combination of the "best parts" of multiple images to generate a high quality composite image. For example, portions of the first image 112, the second (reference) image 141, and/or the third image 113 may be combined to form a high quality composite image of the scene 110 for use in subsequent applications and/or uploading to the image repository 140. In another particular embodiment, the image quality calculation module 125 maintains information regarding which image in a set of images has the highest quality for a particular image feature (e.g., one image may have higher dynamic range for bright image features whereas another image may have higher dynamic range for dark image features). The computing device 120 may dynamically switch between images of the set when a user zooms in or zooms out so that the user continues to see a highest available quality image (or composite image). When the set of images corresponds to images of a common scene (e.g., the scene 110) taken from different viewpoints, the estimated image qualities may be used to infer "global" illumination and structural information regarding the scene. Such information may be useful for three-dimensional (3-D) rendering or scene reconstruction. As an illustrative non-limiting example, a bidirectional reflectance distribution function (BRDF) may be computed.

By determining image quality based on image portions (e.g., subsets of pixels) instead of full images, the image quality calculation module 125 may provide improved speed as compared to "full reference" image quality estimators (which compare two full images to each other) and "reduced reference" image quality estimators (which compare a full image to an image portion). The image quality calculation module 125 is also more flexible than "full reference" and "reduced reference" estimators. For example, the image quality calculation module 125 may perform mutual reference image quality estimation even in situations where the images are not aligned or copies of each other. In contrast, a "full reference" estimator may require use of aligned images, where one image is a degraded version of the other image. A "reduced reference" estimator may require a reference image that is an enlarged version of a test image, so that viewpoint, exposure setting, etc. are constant. Further, by comparing pixels that correspond to a common feature, the image quality calculation module 125 may provide improved accuracy as compared to "no reference" image quality estimators and may determine which of a set of captured images is a "highest quality" image (or a "preferred image").

Figure 2:
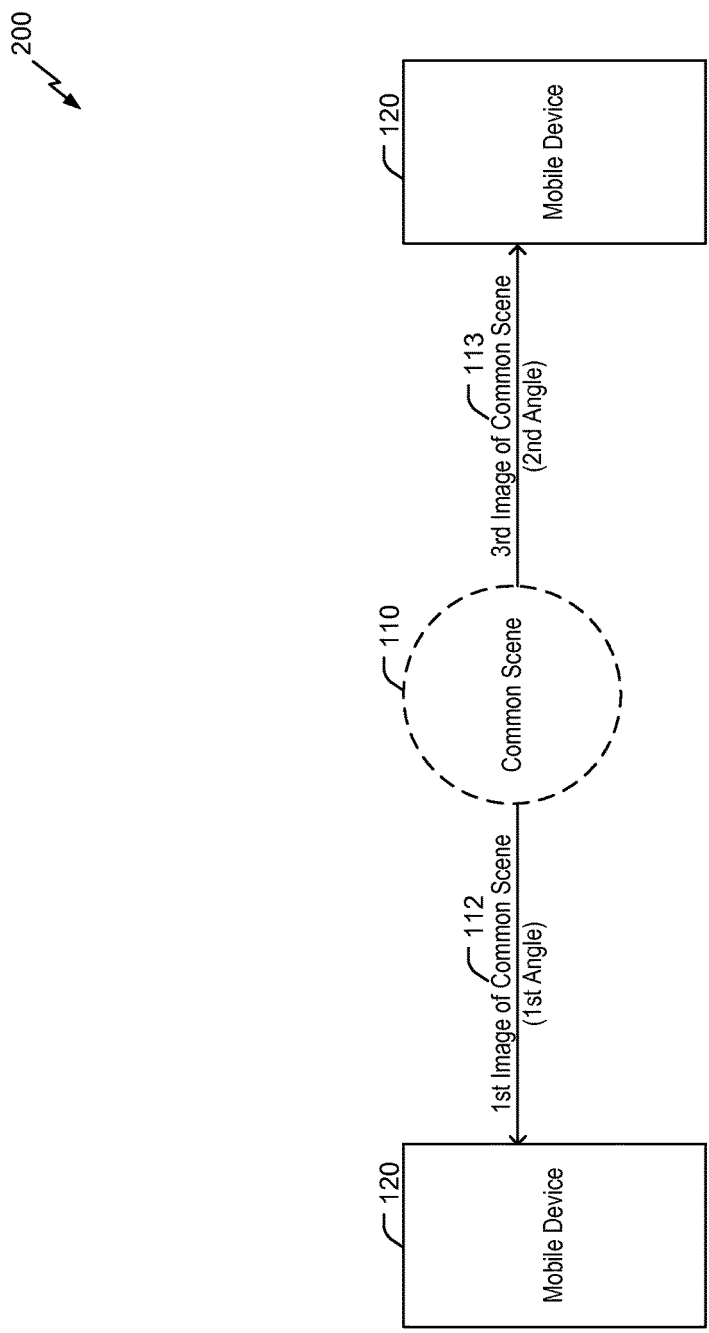
FIG. 2 is a diagram to illustrate a particular embodiment of the computing device of FIG. 1 capturing a set of images.

Referring to FIG. 2, additional details of an image capture environment 200 are shown. The image capture environment 200 includes the common scene 110 and illustrates the computing device 120 (e.g., a mobile device) at a first location capturing the first image 112 at a first angle and the computing device 120 at a second location capturing the third image 113 at a second angle. For example, the user of the computing device 120 may be at a first location and may take one or more pictures via a camera of the computing device 120 of a particular common scene 110. At a subsequent time, the user of the computing device 120 may move to a second location and may capture other images (e.g., the third image 113) at a second time and at a second location. While the computing device 120 is illustrated as taking pictures or otherwise capturing images at two different angles and two different locations, it should be understood that the computing device 120 may capture one or more images at multiple locations (e.g., greater than two locations). The computing device 120 may store each of the captured images and may perform comparisons and other processing functions as described with respect to FIG. 1. For example, the computing device 120 may perform a comparison of a first portion of the first image 112 with respect to a second portion of the second (reference) image 141, and the computing device 120 may compare a third portion of the third image 113 to the second portion of the second image 141. Based on a quality comparison of a subset of pixels of the first image 112 as compared to a corresponding subset of pixels of the second image 141, an image quality may be determined for the first image 112. Similarly, an image quality of the third image 113 may be determined based on a comparison of a subset of pixels of the third image 113 to a corresponding subset of pixels of the second image 141.

After the first image quality of the first image 112 is calculated and after the third image quality of the third image 113 is calculated, the first image quality and the third image quality may be compared in order to determine which image quality is greater. Thus, the user of the computing device 120 may be presented (e.g., a display device of the computing device 120 may display) one of the images 112, 113 that is determined by the computing device 120 as having a greater image quality (e.g., a preferred image). In a particular illustrative embodiment, an image quality of each of the images may be compared to an image quality threshold. For any image having an image quality that does not satisfy the image quality threshold, the image may not be presented for further processing. Thus, the image quality threshold may be used to qualify or prequalify captured images prior to performing comparisons in order to determine a preferred image.

In a particular illustrative embodiment, the first image 112, the second image 141, and the third image 113 are not aligned. For example, subsets of pixels of the first image 112, the second image 141, and the third image 113 may be located in different positions within the images. Such variation may occur, for example, due to the difference of viewpoints/angles between the images 112, 141, and 113. Even though the images 112, 141, and 113 are not aligned, subsets (e.g., portions) of the images may be compared to each other during image processing. In a particular embodiment, a common feature is detected in each of the images via a feature detection algorithm and is used to align the images (or to identify corresponding portions of the images) for comparison purposes.

While the first image 112 and the third image 113 have been described as being compared to a second image 141 that is received from an external repository, in other embodiments, the second image 141 is another image captured by the computing device 120. In this embodiment, multiple images captured by the computing device 120 are compared with respect to other images also captured by the computing device 120 in order to estimate image quality as described herein. In this case, the computing device 120 may perform image processing and image quality assessments regardless of connectivity via a network, such as the network 130 of FIG. 1. Thus, the computing device 120 may operate in an un-networked or stand-alone environment to perform image processing of captured images.

Figure 3:
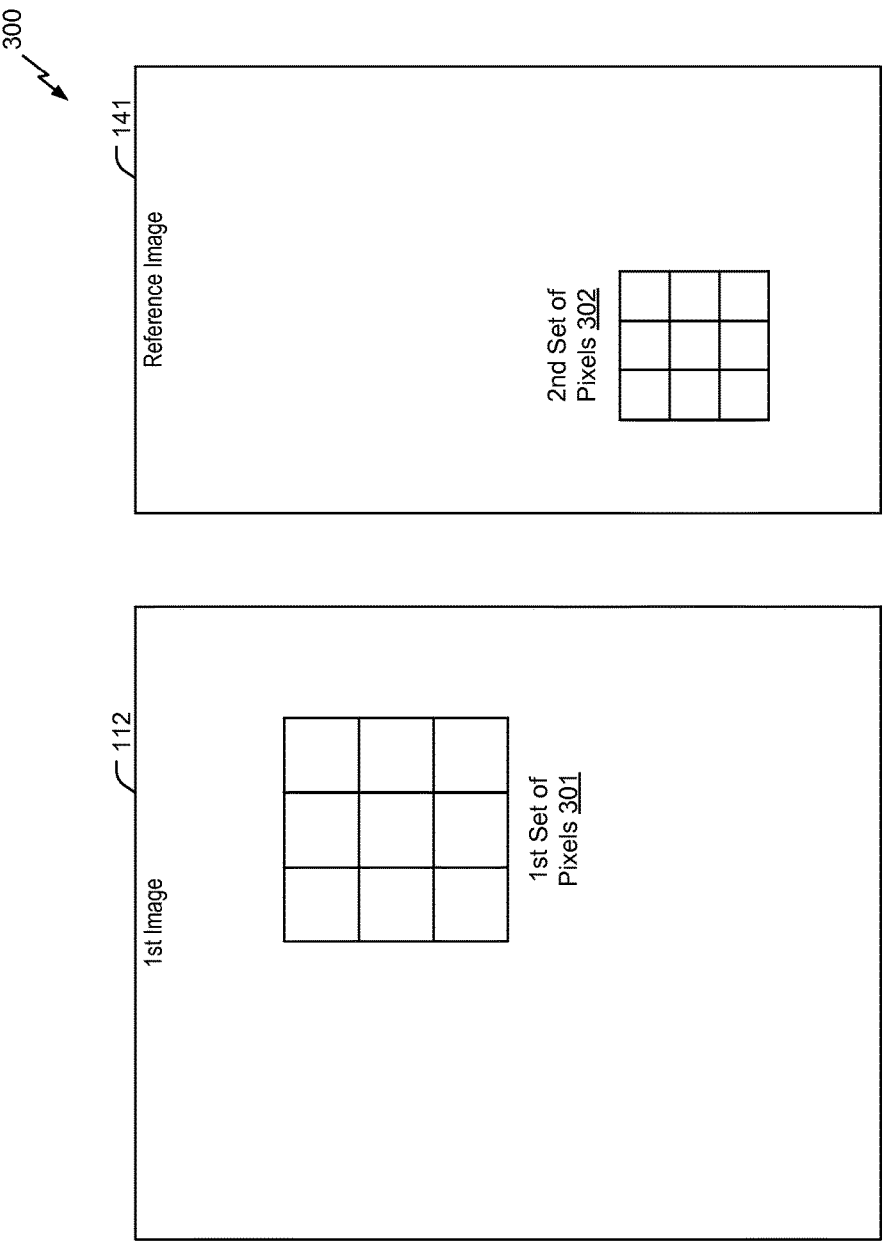
FIG. 3 is a diagram to illustrate a particular embodiment of a method of comparing a captured image and a reference image.

Referring to FIG. 3, further details regarding multiple images are shown and generally designated 300. FIG. 3 includes a display of the first image 112 and the second (reference) image 141. As shown in FIG. 3, the images 112, 141 may have different sizes/resolutions. The images 112, 141 may also differ with respect to color space (e.g., 8-bit grayscale, 16-bit color, or 32-bit color), applied image filters (e.g., high dynamic range (HDR)), or other aspects.

The first image 112 includes a first set of pixels 301 and the second image 141 includes a second set of pixels 302. The first set of pixels 301 corresponds to a feature or sub-portion of a captured scene (e.g., the scene 110 of FIGS. 1-2). The second set of pixels 302 corresponds to the same feature or sub-portion of the scene. During a comparison as part of determining image quality, the first set of pixels 301 is compared to the second set of pixels 302. An image quality algorithm is executable by a processor when the computing device 120 identifies matching spatial regions, such as the region corresponding to the first set of pixels 301 and the second region corresponding to the second set of pixels 302, and uses the information available in the region to characterize an amount of missing information in a similar region. For example, based on a comparison of the first set of pixels 301 and the second set of pixels 302, a processor executing an image processing algorithm may determine an amount of missing information with respect to the captured scene within the subset identified. To illustrate, if the second set of pixels 302 has greater contrast variation than the first set of pixels 301, it may be determined that certain details in the first set of pixels 301 are "washed out" due to a contrast balance or exposure setting. The comparison may be extended to multiple images (e.g., more than two images). Characterization (e.g., estimation of quality of each image of a set of images) may be used to select a best image or a preferred image in the set or to select images of a set with a quality above an acceptability image quality threshold, as described with reference to FIG. 1.

A processor executing the image quality algorithm receives image data corresponding to two or more images of a similar scene and computes a quality of one of the images based on use of the other images as partial references. One or more of the images may be obtained via an external source, such as via a wide area network. The processor executing the image quality algorithm identifies correspondences or matches between features of a set of images and computes a quality estimate for each image using content of the other images in the set for each of the features. The images in the set may not be aligned and may have different characteristics. The image quality algorithm may enable estimation of impairments in images including estimates of impacts of different exposure settings. The image quality algorithm takes advantage of information about a scene that is available from similar images. Feature points (e.g., SIFT, SURF, FAST, etc.) are used to identify spatial correspondents from one image to another within a set of images. The feature points may be used as references for estimating relative quality of two images. Color balance and color saturation can also be estimated by comparing images taken at different camera settings.

Figure 4:
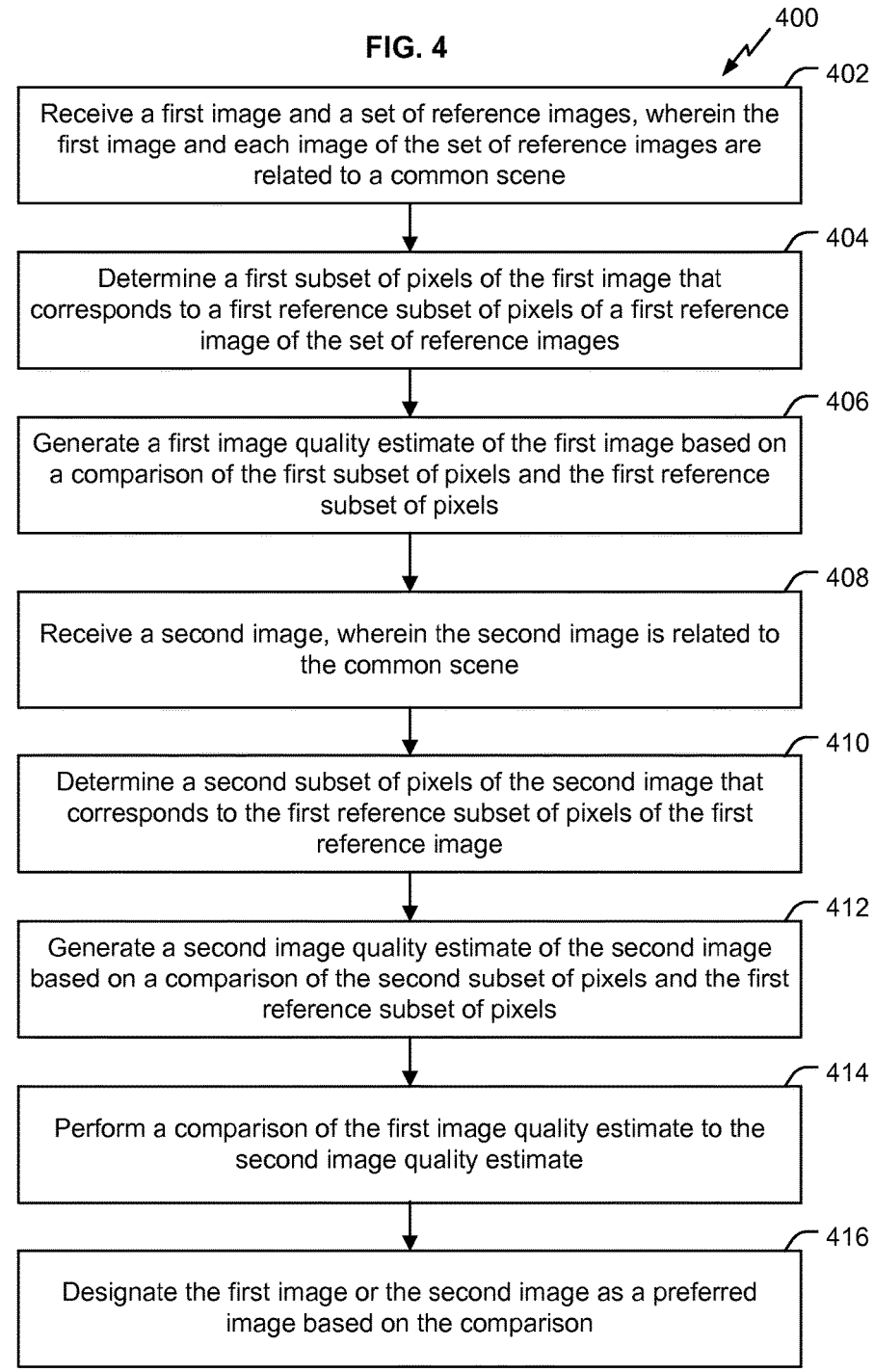
FIG. 4 is a flowchart to illustrate a particular embodiment of a method of estimating an image quality of an image using a reference image portion.

Referring to FIG. 4, a particular illustrative embodiment of a method 400 of estimating image quality using a reference image portion is shown. In an illustrative embodiment, the method 400 may be performed by the computing device 120 of FIG. 1.

The method 400 includes receiving a first image and a set of reference images where the first image and each image of the set of reference images are related to a common scene, at 402. For example, the first image may be the first image 112 of FIG. 1 and the set of reference images may include the second image 141 of FIG. 1. In a particular embodiment, the first image and the reference images are part of a common set of images captured by a particular device. Alternatively, at least one of the reference images may be captured by a different device and/or downloaded by the particular device. The method 400 further includes determining a first subset of pixels of the first image that corresponds to a first reference subset of pixels of a first reference image of the set of reference images, at 404. For example, the first subset of pixels may be the pixels 301 of FIG. 3 and the second subset of pixels may be the pixels 302 of FIG. 3. The method 400 further includes generating a first image quality estimate of the first image based on a comparison of the first subset of pixels and the first reference subset of pixels, at 406. The method 400 further includes receiving a second image, wherein the second image is related to the common scene, at 408. For example, the computing device 120 may receive the third image 113 of FIG. 1.

The method 400 further includes determining a second subset of pixels of the second image that corresponds to the reference subset of pixels of the first reference image of the set of reference images, at 410. The method 400 further includes generating a second image quality estimate of the second image based on a comparison of the second subset of pixels and the first reference subset of pixels, at 412.

The method 400 further includes performing a comparison of the first image quality estimate to the second image quality estimate, at 414. Based on the results of comparing the first image quality estimate to the second image quality estimate, the method 400 further includes designating the first image or the second image as a preferred image based on the comparison, at 416. The method 400 of FIG. 4 may thus enable a computing device, such as the computing device 120, to estimate image quality of multiple images in a set of images based on comparison of a portion (e.g., subset of pixels) in each of the images in the set of images to a corresponding portion of one or more reference images.

Figure 5:
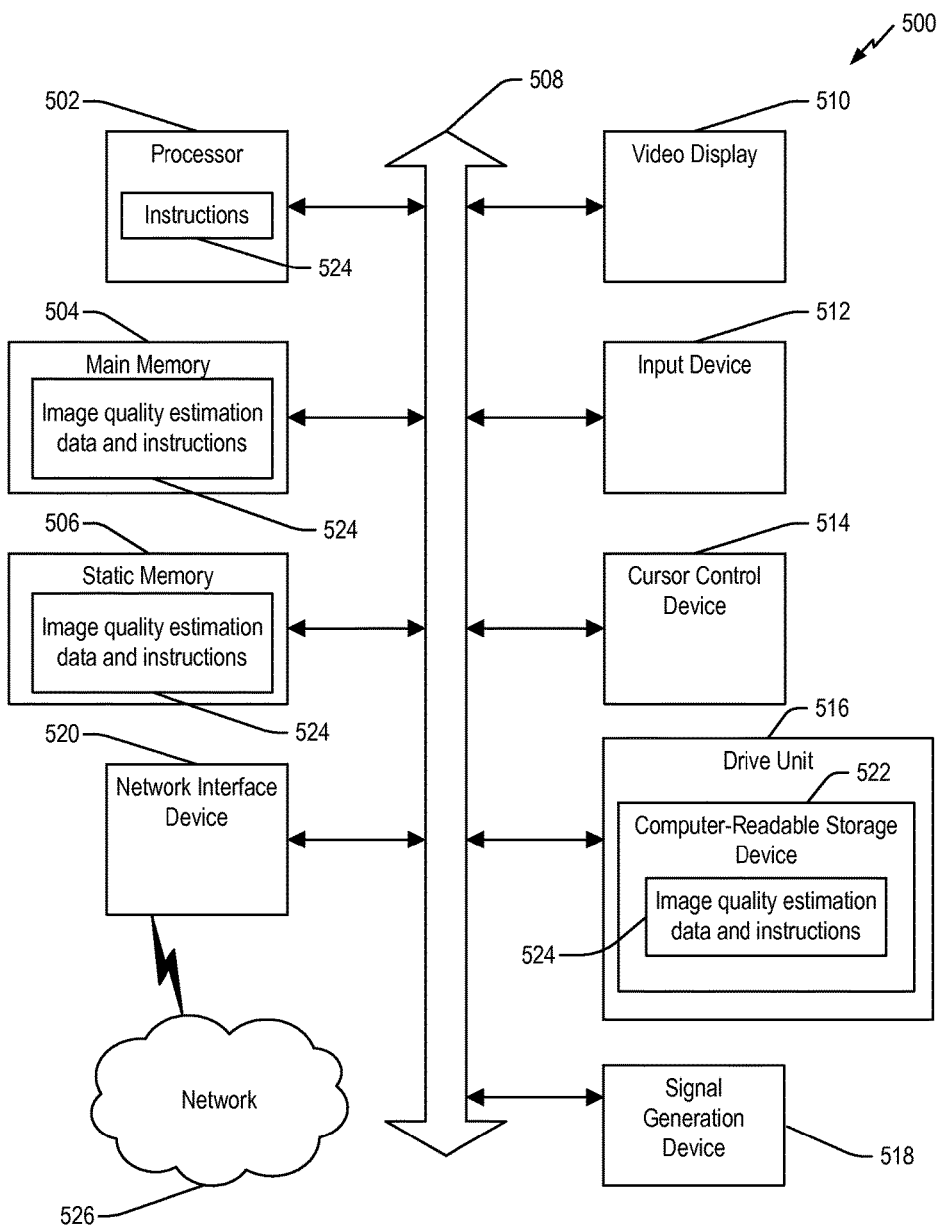
FIG. 5 is a diagram to illustrate a computer system including components supporting one or more of the systems and methods of the present disclosure.

FIG. 5 illustrates a particular embodiment of a general computer system 500 including components that are operable to estimate image quality. The general computer system 500 may include a set of instructions that can be executed to cause the general computer system 500 to perform any one or more of the methods or computer based functions disclosed herein. The general computer system 500 may operate as a standalone device or may be connected, e.g., using a network, to other computer systems or peripheral devices. For example, the general computer system 500 may include, may be included within, or correspond to one or more of the components of the computing device 120, the image repository 140, or a combination thereof.

In a networked deployment, the general computer system 500 may operate in the capacity of a server or as a client user computer in a server-client user network environment, or as a peer computer system in a peer-to-peer (or distributed) network environment. The general computer system 500 may also be implemented as or incorporated into various devices, such as a mobile device, a palmtop computer, a laptop computer, a desktop computer, a communications device, a wireless telephone, a personal computer (PC), a tablet PC, a personal digital assistant (PDA), a set-top box, a customer premises equipment device, an endpoint device, a web appliance, or any other machine capable of executing a set of instructions (sequential or otherwise) that specify actions to be taken by that machine. In a particular embodiment, the general computer system 500 may be implemented using electronic devices that provide video, audio, or data communication. Further, while one general computer system 500 is illustrated, the term "system" shall also be taken to include any collection of systems or sub-systems that individually or jointly execute a set, or multiple sets, of instructions to perform one or more computer functions.

As illustrated in FIG. 5, the general computer system 500 includes a processor (or controller) 502, e.g., a central processing unit (CPU), a graphics processing unit (GPU), or both. Moreover, the general computer system 500 may include a main memory 504 and a static memory 506, which can communicate with each other via a bus 508. As shown, the general computer system 500 may further include a video display unit 510, such as a liquid crystal display (LCD), a light emitting diode (LED) display, a touch screen display, a flat panel display, a solid-state display, or a lamp assembly of a projection system. Additionally, the general computer system 500 may include an input device 512, such as a keyboard, and a cursor control device 514, such as a mouse. In some embodiments, the input device 512 and the cursor control device 514 may be integrated into a single device, such as a capacitive touch screen input device. The general computer system 500 may also include a drive unit 516, a signal generation device 518, such as a speaker or remote control, and a network interface device 520. The general computer system 500 may not include an input device (e.g., a server may not include an input device).

In a particular embodiment, as depicted in FIG. 5, the drive unit 516 may include a computer-readable storage device 522 in which one or more sets of data and instructions 524, e.g. software, can be embedded. The computer-readable storage device 522 may be random access memory (RAM), read-only memory (ROM), programmable read-only memory (PROM), erasable PROM (EPROM), electrically erasable PROM (EEPROM), register(s), solid-state memory, hard disk, a removable disk, a compact disc read-only memory (CD-ROM), other optical disk storage, magnetic disk storage, magnetic storage devices, or any other storage device that can be used to store program code in the form of instructions or data and that can be accessed by a computer and/or processor. A computer-readable storage device is not a signal. Further, the instructions 524 may embody one or more of the methods or logic as described herein. The instructions 524 may be executable by the processor 502 to perform one or more functions or methods described herein, such as image quality calculation/estimation based on comparisons of image portions of a set of images. In a particular embodiment, the instructions 524 may reside completely, or at least partially, within the main memory 504, the static memory 506, and/or within the processor 502 during execution by the general computer system 500. The main memory 504 and the processor 502 also may include a computer-readable storage device.

In an alternative embodiment, dedicated hardware implementations, such as application specific integrated circuits, programmable logic arrays and other hardware devices, may be constructed to implement one or more of the methods described herein. Various embodiments may broadly include a variety of electronic and computer systems. One or more embodiments described herein may implement functions using two or more specific interconnected hardware modules or devices with related control and data signals that can be communicated between and through the modules, or as portions of an application-specific integrated circuit (ASIC). Accordingly, the present system encompasses software, firmware, and hardware implementations.

In accordance with various embodiments of the present disclosure, the methods described herein may be implemented by software programs executable by a computer system, a processor, or a device, which may include (forms of instructions embodied as a state machine implemented with logic components in an ASIC or a field programmable gate array (FPGA) device.) Further, in an exemplary, non-limiting embodiment, implementations may include distributed processing, component/object distributed processing, and parallel processing. Alternatively, virtual computer system processing may be constructed to implement one or more of the methods or functionality as described herein. It is further noted that a computing device, such as a processor, a controller, a state machine or other suitable device for executing instructions to perform operations or methods may perform such operations directly or indirectly by way of one or more intermediate devices directed by the computing device.

A computer-readable storage device 522 may stores the data and instructions 524 or receives, stores, and executes the data and instructions 524, so that a device may perform image quality calculation/estimation as described herein. For example, the computer-readable storage device 522 device may include or be included within one or more of the components of the computing device 120. While the computer-readable storage device 522 is shown to be a single device, the computer-readable storage device 522 may include a single device or multiple devices, such as a centralized or distributed database, and/or associated caches and servers that store one or more sets of instructions. The computer-readable storage device 522 is capable of storing a set of instructions for execution by a processor to cause a computer system to perform any one or more of the methods or operations disclosed herein.

In a particular non-limiting, exemplary embodiment, the computer-readable storage device 522 may include a solid-state memory such as embedded memory (or a memory card or other package that houses one or more non-volatile read-only memories). Further, the computer-readable storage device 522 may be a random access memory or other volatile re-writable memory. Additionally, the computer-readable storage device 522 may include a magneto-optical or optical device, such as a disk or tapes or other storage device. Accordingly, the disclosure is considered to include any one or more of a computer-readable storage device and other equivalents and successor devices, in which data or instructions may be stored.

Although one or more components and functions may be described herein as being implemented with reference to a particular standard or protocols, the disclosure is not limited to such standards and protocols. For example, standards for internet and other network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth, Wi-Fi, Zigbee), and long-range communications (e.g., WiMAX, GSM, CDMA, LTE) can be used by the computer system 500 in selected embodiments.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Figures are also merely representational and may not be drawn to scale. Certain proportions thereof may be exaggerated, while others may be minimized. Accordingly, the disclosure and the figures are to be regarded as illustrative rather than restrictive.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments.

Less than all of the steps or functions described with respect to the exemplary processes or methods can also be performed in one or more of the exemplary embodiments. Further, the use of numerical terms to describe a device, component, step or function, such as first, second, third, and so fourth, is not intended to describe an order or function unless expressly stated. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be implemented as multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, an application specific integrated circuit, and/or a programmable gate array (PGA) including a Field PGA. In one or more embodiments, when a processor executes instructions to perform "operations", this can include the processor performing the operations directly and/or facilitating, directing, or cooperating with another device or component to perform the operations.

The Abstract is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method comprising:
   receiving, by a device comprising a processor, a first image of a scene;
   receiving, at the device, a second image of at least a portion of the scene;
   determining, by the device, a first subset of pixels of the first image, the first subset of pixels representing a particular feature of the scene, wherein the determining the first subset of pixels includes identifying a first plurality of features from the first image;
   determining, by the device, a second subset of pixels of the second image, the second subset of pixels representing the particular feature of the scene, wherein the determining the second subset of pixels includes:
   identifying a second plurality of features from the second image, wherein the second plurality of features includes the particular feature;
   comparing the first plurality of features to the second plurality of features to identify a subset of common features, wherein the subset of common features includes the particular feature; and
   determining a particular subset of pixels that correspond to the particular feature in the second image based on the subset of common features, wherein the particular subset of pixels is the second subset of pixels; and
   generating, by the device, a first image quality estimate of the first image based on a comparison of a first degree of variation within the first subset of pixels and a second degree of variation within the second subset of pixels.

2. The method of claim 1, wherein the second subset of pixels are determined independent of a grid location of the first subset of pixels.

3. The method of claim 1, wherein the first degree of variation corresponds to first variation of color intensity of the first subset of pixels, and wherein the second degree of variation corresponds to a second variation of color intensity of the second subset of pixels.

4. The method of claim 1, wherein the first degree of variation corresponds to coloration of the first subset of pixels, and wherein the second degree of variation corresponds to coloration of the second subset of pixels.

5. The method of claim 1, further comprising:
   receiving a third image of at least a portion of the scene;
   generating a third quality image estimate of the third image based on a comparison of a third degree of variation within a third subset of pixels of the third image and the second degree of variation within the second subset of pixels, wherein the third subset of pixels corresponds to the particular feature; and performing a comparison of the first image quality estimate to the third quality image estimate.

6. The method of claim 5, further comprising designating the first image or the third image as a preferred image based on the comparison of the first image quality estimate to the third quality image estimate.

7. The method of claim 5, further comprising determining that the first image quality estimate and the third image quality estimate satisfy an image quality threshold.

8. The method of claim 1, wherein the device comprises a camera, and wherein the first image is captured by the camera.

9. The method of claim 1, wherein the first image depicts the particular feature from a first angle, and wherein the second image depicts the particular feature from a second angle distinct from the first angle.

10. The method of claim 1, wherein the first degree of variation corresponds to spatial frequency of the first subset of pixels, and wherein the second degree of variation corresponds to spatial frequency of the second subset of pixels.

11. The method of claim 1, wherein the first image has a different resolution than the second image.

12. The method of claim 1, wherein the first image and the second image are captured by different devices.

13. The method of claim 1, wherein the first image has a different color space than the second image.

14. The method of claim 1, further comprising:
comparing the first image quality estimate to a threshold; and
generating an indication that the first image has an acceptable image quality based on the first image quality estimate satisfying the threshold.

15. An apparatus comprising:
a processor; and
a memory storing instructions executable by the processor to perform operations comprising:
receiving a first image of a scene;
receiving a second image of at least a portion of the scene;
determining a first subset of pixels of the first image, the first subset of pixels representing a particular feature of the scene, wherein the determining the first subset of pixels includes identifying a first plurality of features from the first image;
determining a second subset of pixels of the second image, the second subset of pixels representing the particular feature of the scene, wherein the determining the second subset of pixels includes:
identifying a second plurality of features from the second image, wherein the second plurality of features includes the particular feature;
comparing the first plurality of features to the second plurality of features to identify a subset of common features, wherein the subset of common features includes the particular feature; and
determining a particular subset of pixels that correspond to the particular feature in the second image based on the subset of common features, wherein the particular subset of pixels is the second subset of pixels; and
generating a first image quality estimate of the first image based on a comparison of a first degree of variation within the first subset of pixels and a second degree of variation within the second subset of pixels.

16. The apparatus of claim 15, wherein the operations further comprise:
receiving a third image of at least a portion of the scene; and
generating a third quality image estimate of the third image based on a second comparison of a third subset of pixels of the third image and the second subset of pixels, wherein the third subset of pixels corresponds to the particular feature.

17. The apparatus of claim 16, wherein the operations further comprise:
performing a third comparison of the first image quality estimate to the third quality image estimate; and
designating the first image or the third image as a preferred image based on the third comparison.

18. A computer-readable storage device storing instructions that, when executed by a computer, cause the computer to perform operations comprising:
receiving a first image of a scene;
receiving a second image of at least a portion of the scene;
determining a first subset of pixels of the first image, the first subset of pixels representing a particular feature of the scene, wherein the determining the first subset of pixels includes identifying a first plurality of features from the first image;
determining a second subset of pixels of the second image, the second subset of pixels representing the particular feature of the scene, wherein the determining the second subset of pixels includes:
identifying a second plurality of features from the second image, wherein the second plurality of features includes the particular feature;
comparing the first plurality of features to the second plurality of features to identify a subset of common features, wherein the subset of common features includes the particular feature; and
determining a particular subset of pixels that correspond to the particular feature in the second image based on the subset of common features, wherein the particular subset of pixels is the second subset of pixels; and
generating a first image quality estimate of the first image based on a comparison of a first degree of variation within the first subset of pixels and a second degree of variation within the second subset of pixels.

19. The computer-readable storage device of claim 18, wherein the first degree of variation corresponds to contrast associated with the first subset of pixels, and wherein the second degree of variation corresponds to contrast associated with the second subset of pixels.

20. The computer-readable storage device of claim 18, wherein the operations further comprise:
receiving a third image of at least a portion of the scene;
generating a third quality image estimate of the third image based on a second comparison of a third subset of pixels of the third image and the second subset of pixels;
performing a third comparison of the first image quality estimate to the third quality image estimate; and
designating the first image or the third image as a preferred image based on the third comparison.

* * * * *